US012199674B2

(12) United States Patent
Seki

(10) Patent No.: US 12,199,674 B2
(45) Date of Patent: *Jan. 14, 2025

(54) LIGHT TRANSMISSION DEVICE, AND CONTROL METHOD OF SAME

(71) Applicant: NEC Corporation, Tokyo (JP)

(72) Inventor: Koji Seki, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/138,275

(22) Filed: Apr. 24, 2023

(65) Prior Publication Data

US 2023/0261747 A1 Aug. 17, 2023

Related U.S. Application Data

(63) Continuation of application No. 17/436,381, filed as application No. PCT/JP2020/006574 on Feb. 19, 2020, now Pat. No. 11,671,176.

(30) Foreign Application Priority Data

Mar. 26, 2019 (JP) .................................. 2019-059076

(51) Int. Cl.
*H04B 10/40* (2013.01)
*H04B 10/079* (2013.01)
(Continued)

(52) U.S. Cl.
CPC . *H04B 10/25759* (2013.01); *H04B 10/07955* (2013.01); *H04B 10/293* (2013.01); *H04B 10/40* (2013.01)

(58) Field of Classification Search
None
See application file for complete search history.

(56) References Cited

U.S. PATENT DOCUMENTS 7,856,185 B2 * 12/2010 Hudgins .............. H04B 10/075
398/24
7,974,537 B2 * 7/2011 Li ....................... H04J 14/0267
398/138

(Continued)

FOREIGN PATENT DOCUMENTS

JP 2004-274585 A 9/2004
JP 2005-348243 A 12/2005
(Continued)

OTHER PUBLICATIONS

International Search Report for PCT Application No. PCT/JP2020/006574 mailed on May 26, 2020.
(Continued)

*Primary Examiner* — Jai M Lee
(74) *Attorney, Agent, or Firm* — Sughrue Mion, PLLC

(57) ABSTRACT

Provided are a light transmission device and a control method of same which can switch a processing sequence according to a vendor of an optical module to be mounted thereon. The light transmission device, which is provided with ports on which optical modules which transmit an optical signal are mounted, is additionally provided with: a storage means for holding a table in which processing sequences respectively corresponding to pieces of identification information about the optical modules are stored; and a control means for acquiring pieces of identification information about the mounted optical modules, determining, with reference to the table, a processing sequence corresponding to the identification information about the acquired optical module, and executing the determined processing sequence for the optical module.

11 Claims, 9 Drawing Sheets

(51) Int. Cl.
*H04B 10/2575* (2013.01)
*H04B 10/293* (2013.01)

(56) References Cited

U.S. PATENT DOCUMENTS

| | | | | |
|---|---|---|---|---|
| 8,358,934 B2* | 1/2013 | Hinderthuer | ....... | H04Q 11/0005 |
| | | | | 398/141 |
| 9,742,496 B2* | 8/2017 | Coffey | ............ | H04B 10/27 |
| 10,075,244 B2* | 9/2018 | Coffey | ............ | H04B 10/40 |
| 10,078,244 B2 | 9/2018 | Coffey | ............ | H04B 10/40 |
| 10,133,668 B2* | 11/2018 | Ramalingam | ....... | G06F 11/1441 |
| 10,284,930 B2* | 5/2019 | Cremin | ............ | H04L 69/22 |
| 10,574,360 B2* | 2/2020 | Komatsu | ......... | H04B 10/07955 |
| 10,761,281 B1* | 9/2020 | Gupta | ............ | G02B 6/3849 |
| 10,826,612 B2 | 11/2020 | Tittenhofer | ............ | H04B 10/40 |
| 10,931,368 B2* | 2/2021 | Mottahedin | ............ | H04L 63/06 |
| 11,356,755 B2* | 6/2022 | Luo | ............ | H04Q 11/0067 |
| 11,455,225 B2* | 9/2022 | Furlong | ............ | H04B 10/66 |
| 11,671,176 B2* | 6/2023 | Seki | ............ | H04B 10/07955 |
| | | | | 398/208 |
| 2004/0136708 A1* | 7/2004 | Woolf | ............ | H04B 17/15 |
| | | | | 398/22 |
| 2007/0092257 A1* | 4/2007 | Smith | ............ | H04B 10/801 |
| | | | | 398/135 |
| 2011/0064417 A1 | 3/2011 | Sato | | |
| 2011/0268443 A1* | 11/2011 | Adler | ............ | H04Q 11/0067 |
| | | | | 398/58 |
| 2011/0299858 A1* | 12/2011 | Mazzini | ............ | H04B 10/516 |
| | | | | 398/183 |
| 2014/0136648 A1* | 5/2014 | Hemmi | ............ | G06F 3/0659 |
| | | | | 709/216 |
| 2015/0086211 A1* | 3/2015 | Coffey | ............ | H04B 10/801 |
| | | | | 398/116 |
| 2018/0123720 A1 | 5/2018 | Nomura | | |
| 2018/0287710 A1 | 10/2018 | Komatsu | | |

FOREIGN PATENT DOCUMENTS

| | | |
|---|---|---|
| JP | 2006-325030 A | 11/2008 |
| JP | 2009-130685 A | 6/2009 |
| JP | 2011-061679 A | 3/2011 |
| WO | 2011/096020 A1 | 8/2011 |
| WO | 2016/139886 A1 | 9/2016 |
| WO | 2017/066350 A1 | 4/2017 |

OTHER PUBLICATIONS

English translation of Written opinion for PCT Application No. PCT/JP2020/006574, mailed on May 26, 2020.
Medhi, Von Neumann Architecture, 2012 (Year: 2012).
JP Office Action for JP Application No. 2023-035596, mailed on Feb. 20, 2024 with English Translation.

* cited by examiner

Fig. 3

DECISION TABLE

| VENDOR ID | FIRST PROCESSING | SECOND PROCESSING | THIRD PROCESSING | FOURTH PROCESSING |
|---|---|---|---|---|
| VENDOR A | PROCESSING 1 | PROCESSING 2 | PROCESSING 3 | PROCESSING 4 |
| VENDOR B | PROCESSING 1 | PROCESSING 2 | PROCESSING 4 | PROCESSING 3 |
| VENDOR C | PROCESSING 3 | PROCESSING 2 | PROCESSING 1 | NONE |
| ANOTHER | PROCESSING 4 | PROCESSING 3 | PROCESSING 2 | PROCESSING 1 |

LIGHT TRANSMISSION DEVICE, AND CONTROL METHOD OF SAME

This application is a Continuation of U.S. application Ser. No. 17/436,381 filed on Sep. 3, 2021, which is a National Stage Entry of PCT/JP2020/006574 filed on Feb. 19, 2020, which claims priority from Japanese Patent Application No. 2019-059076 filed on Mar. 26, 2019, the contents of all of which are incorporated herein by reference, in their entirety.

TECHNICAL FIELD

The present invention relates to a light transmission device and a control method of the same, and particularly relates to a control for an optical module having a conversion function between an electrical signal and an optical signal.

BACKGROUND ART

A light transmission device that transmits/receives an optical signal via an optical fiber network mounts thereon an optical module having a conversion function between an electrical signal and an optical signal. There is a transponder device as an example of such a light transmission device, and there is an optical transceiver as an example of such an optical module.

In such a light transmission device, mainly adopted is a pluggable optical module configured to be insertable into and removable from the light transmission device. By using the pluggable optical module, an optical module can be added or exchanged after a system including the light transmission device is activated. For this pluggable optical module, a group standard (multi source agreement (MSA)) that prescribes a structure and an interface thereof is present. A vendor of each optical module has been developing an optical module that meets a requirement of this group standard.

Patent Literature 1 (PTL1) relates to a light transmission device, and proposes to read, by dedicated software, information required for maintenance such as a vendor (manufacturer) code, a manufacturing date, a serial number, and a wavelength. Herein, these pieces of information are written into the pluggable optical module. PTL1 describes that it can be inspected whether an optical module different from setting is mounted and the like, by a network administrator referring to the read information required for maintenance.

CITATION LIST

Patent Literature

[PTL1] International Publication No. WO2011/096020

SUMMARY OF INVENTION

Technical Problem

Meanwhile, the optical module mounted on the light transmission device executes a variety of processing sequences in accordance with an instruction from the light transmission device. The variety of processing sequences in the optical module having the conversion function between the electrical signal and the optical signal include a boot sequence of the optical module, a wavelength switching sequence of the optical signal being output by the optical module, and the like.

FIG. 9 is a configuration diagram for explaining the light transmission device and the like in the background art. A light transmission device 100 in FIG. 9 is mounted with a pluggable optical module configured to be insertable into and removable from the light transmission device 100.

The light transmission device 100 in FIG. 9 includes a non-volatile memory 102, and a central processing unit (CPU) 103. The light transmission device 100 in FIG. 9 includes four ports as an example of a plurality of ports, and four optical modules 104 to 107 as an example of a plurality of the pluggable optical modules are each mounted on the ports. Heretofore, it has been common that all of the pluggable optical modules to be connected to the light transmission device are manufactured by the same vendor. Specifically, it has been common that the optical modules 104 to 107 in FIG. 9 are manufactured by a same vendor called a vendor A, for example. Firmware for controlling pluggable optical modules is held in the non-volatile memory 102, and this is firmware for controlling the optical modules 104 to 107 manufactured by the vendor A. In this case, the light transmission device 100 in FIG. 9 has been capable of executing the same processing sequence for all the pluggable optical modules.

By using pluggable optical modules which meet the requirement of the group standard, it is possible to add or exchange the optical module after the system including the light transmission device is activated. By using such an advantage, in recent years, some or all of optical modules to be connected to an optical communication device can also be changed during operation of the system. For example, a user of the light transmission device can also change the optical module during the operation of the system in consideration of performance and cost of the optical module.

Herein, when a user of the light transmission device changes the optical module, a manufacturing vendor of a changed optical module may differ from a manufacturing vendor of an optical module connected when the operation is started. When the manufacturing vendor of the optical modules differs, a content of a processing sequence to be executed for the optical module may also differ.

It is desirable that the processing sequence be also changeable when the manufacturing vendor of the optical module mounted on the light transmission device becomes different due to addition or exchange of the optical module. However, PTL1 does not disclose any method of solving the above-described problem.

Hence, an object of the present invention is to provide a light transmission device capable of switching a processing sequence in response to an optical module to be mounted, and to provide a control method of the same.

Solution to Problem

In order to achieve the above-described object, a light transmission device according to the present invention is
a light transmission device provided with a port to be mounted with an optical module that transmits an optical signal, the light transmission device including:
a storage means for holding a table in which a processing sequence associated to each piece of identification information of the optical module is stored; and
a control means for acquiring identification information of the optical module to be mounted, determining a processing sequence associated to the acquired identification information of the optical module with reference to the table, and executing a determined processing sequence for the optical module.

A control method of a light transmission device according to the present invention is a control method of a light transmission device provided with a port to be mounted with an optical module that transmits an optical signal, the control method including:

acquiring identification information of the optical module to be mounted;

determining a processing sequence associated to the identification information of the optical module from the acquired identification information of the optical module to be mounted; and executing a determined processing sequence for the optical module.

Advantageous Effects of Invention

According to the present invention, there can be provided a light transmission device capable of switching a processing sequence in response to an optical module to be mounted, and can be provided a control method of the same.

BRIEF DESCRIPTION OF DRAWINGS

FIG. 3 is a diagram illustrating an example of a decision table to be referred to for determining a processing sequence from a vendor ID as an example of identification information of an optical module.

FIG. 9 is a configuration diagram for explaining the light transmission device in the background art and the like.

EXAMPLE EMBODIMENTS

Preferred example embodiments of the present invention will be described in detail with reference to the drawings.

First Example Embodiment

Figure 1:
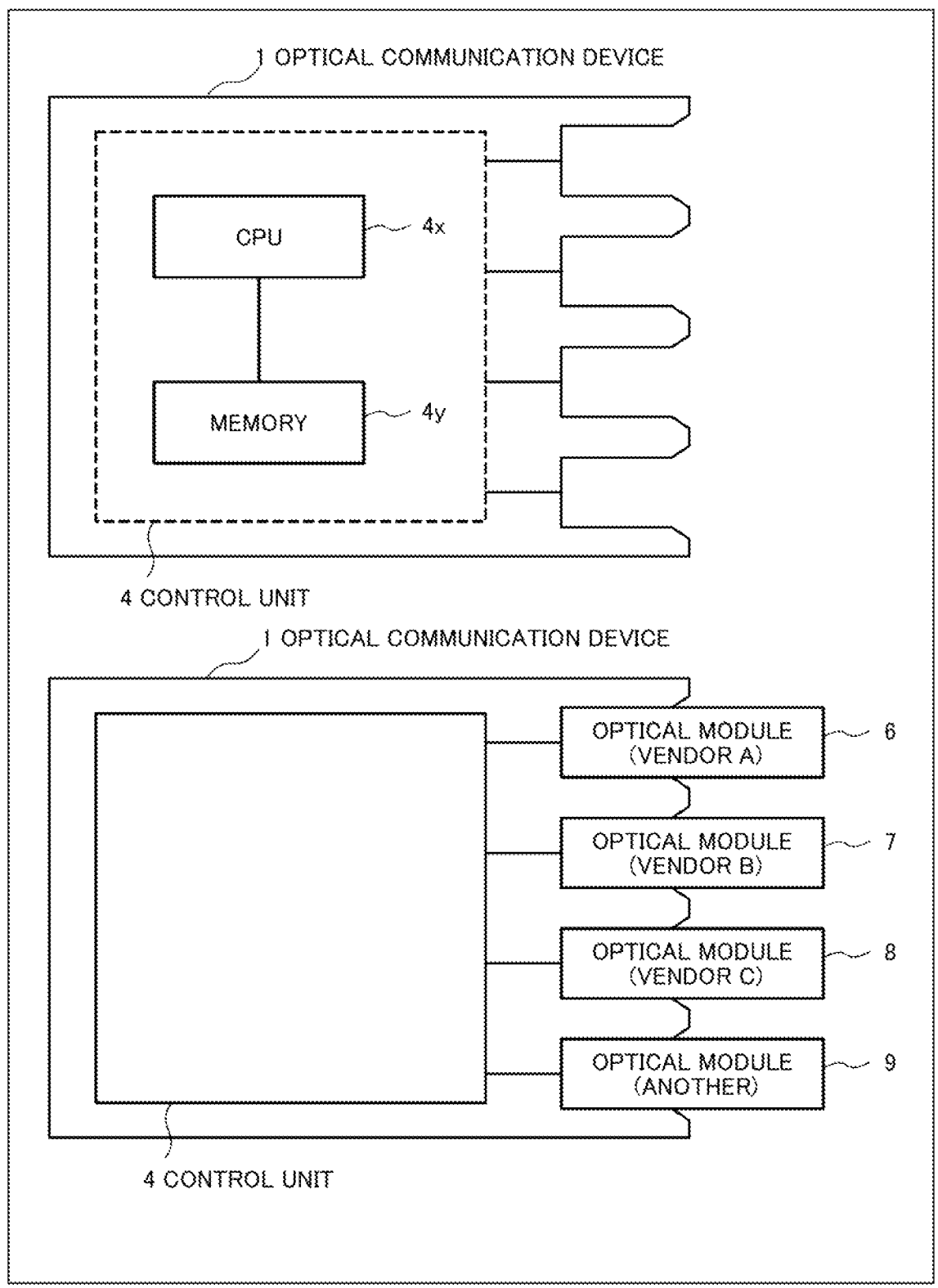
FIG. 1 is a configuration diagram for explaining a light transmission device according to a first example embodiment.
Figure 2:
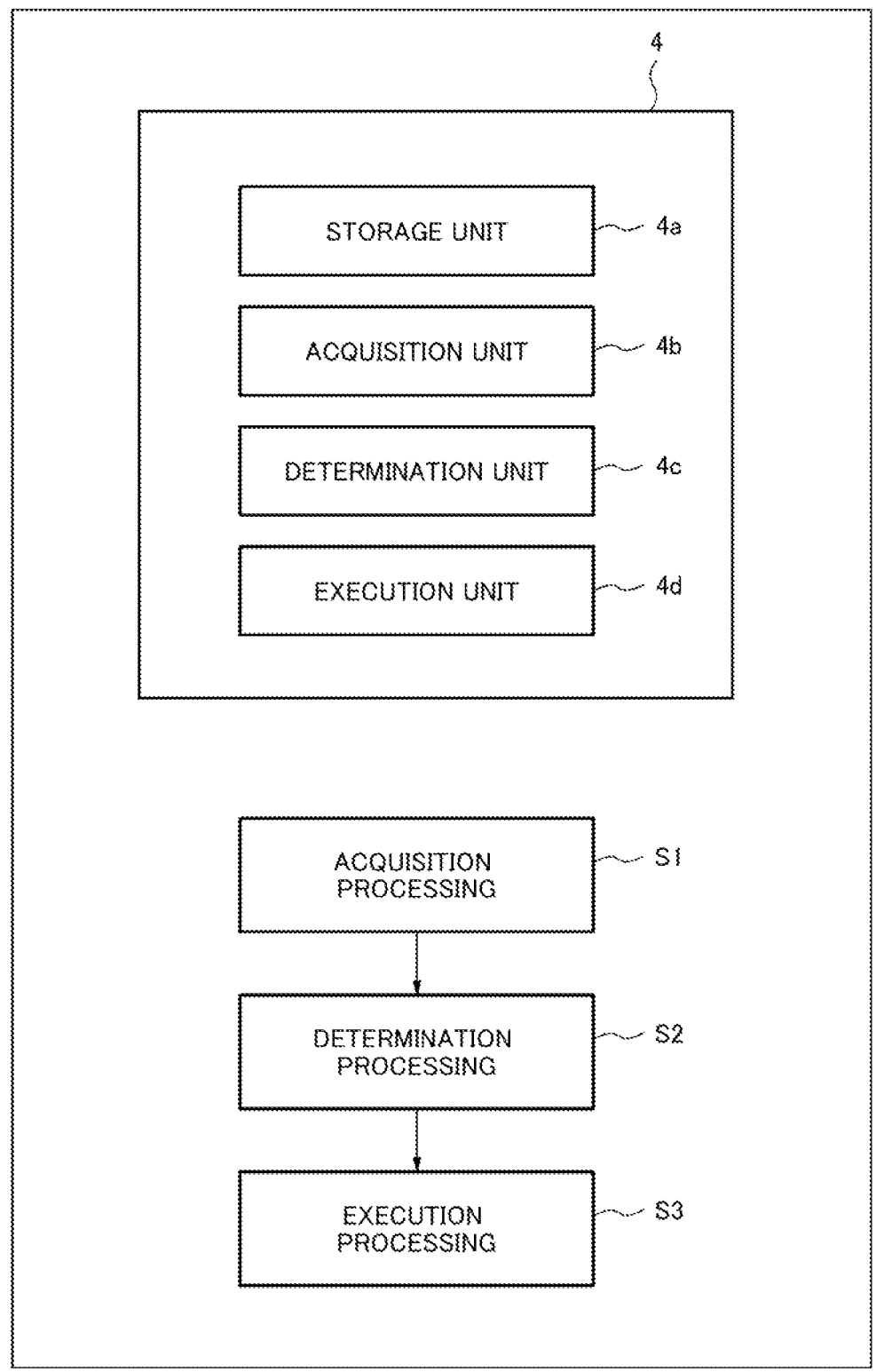
FIG. 2 is a block diagram for explaining a more specific configuration of a control unit 4 in FIG. 1, and is a flowchart for explaining processing to be executed by the control unit 4.

First, a description will be given of a light transmission device according to a first example embodiment of the present invention and a control method of the same. FIG. 1 is a configuration diagram for explaining the light transmission device according to the first example embodiment of the present invention. FIG. 2 is a block diagram for explaining a more specific configuration of a control unit 4 in FIG. 1, and is a flowchart for explaining processing to be executed by the control unit 4.

(Configuration of Light Transmission Device)

FIG. 1 illustrates an optical communication device as an example of a light transmission device that transmits/receives an optical signal via an optical fiber network. An optical communication device 1 in FIG. 1 is a light transmission device provided with four ports, the light transmission device serving as an example of a light transmission device provided with ports to be mounted with optical modules which transmit optical signals. The optical communication device 1 is a transponder device. The optical communication device 1 in FIG. 1 has the control unit 4 including a central processing unit (CPU) 4x and a memory 4y.

The central processing unit (CPU) 4x has a function of executing control of the optical communication device 1 and optical modules 6 to 9.

The memory 4y includes programs of a storage unit 4a, an acquisition unit 4b, a determination unit 4c, and an execution unit 4d in FIG. 2, which operate on the CPU 4x.

On an upper side of FIG. 1, the optical communication device 1 in an unmounted state with optical modules is illustrated, and on a lower side of FIG. 1, the optical communication device 1 in a state in which the optical modules 6 to 9 are mounted on four ports is illustrated. Herein, it is assumed that the optical module 6 is an optical module by a vendor A, that the optical module 7 is an optical module by a vendor B, that the optical module 8 is an optical module by a vendor C, and that the optical module 9 is an optical module by another vendor different from the vendors A to C.

The optical modules 6 to 9 are pluggable optical modules having a configuration insertable into and removable from the ports of the optical communication device 1, and are optical transceivers. The optical modules 6 to 9 convert, into optical signals, data signals (electrical signals) input via the optical communication device 1, and output the optical signals to the outside. The optical modules 6 to 9 also have control units, which are not illustrated, inside, and transfer control signals with the control unit 4 of the optical communication device 1. As types of the pluggable optical modules, there are a 100G form-factor pluggable (CFP), a small form-factor pluggable (SFP), a quad small form-factor pluggable (QSFP), and the like.

As in the flowchart on a lower side of FIG. 2, the control unit 4 of the optical communication device 1 sequentially implements acquisition processing (S1) of acquiring identification information of the optical module to be mounted, determination processing (S2) of determining, from the acquired identification information of the optical module, a processing sequence associated to the identification information of the optical module, and execution processing (S3) of executing the determined processing sequence for the optical module. Thus, for the optical module mounted on the light transmission device, the control unit 4 of the optical communication device 1 can implement the processing sequence in accordance with the identification information of the optical module. Herein, the processing sequence is processing or an order of pieces of processing when there are a plurality of pieces of processing.

A control program of the light transmission device, the control program achieving the above-described acquisition processing, the above-described determination processing, and the above-described execution processing, can be distributed in a form of a computer-readable recording medium.

This program can be distributed in a form of a general-purpose semiconductor recording device such as a compact flash (CF (registered trademark)) and a secure digital (SD), a magnetic recording medium such as a flexible disk, an optical recording medium such as a compact disk read only memory (CD-ROM), or the like.

As the identification information of the optical modules, single information or a combination of plural pieces of information can be used. In the present example embodiment, a description will be given below of a case of using vendor information of the optical modules as an example of the identification information of the optical modules. As the identification information of the optical modules, there can be used information other than the vendor information, such as product names, product numbers, and model numbers of the optical modules.

The processing sequence to be executed for the optical module each of which converts a data signal (an electrical signal) into an optical signal and outputs the optical signal to the outside includes a boot sequence, a wavelength switching sequence, and the like. Herein, an order of executing the processing which constitutes the boot sequence is not prescribed in the group standard, and differs for each manufacturing vendor of the optical modules.

The control unit 4 of the optical communication device 1 reads, into the memory 4y in FIG. 1, the program for achieving the above-described acquisition processing, the above-described determination processing, and the above-described execution processing, and the CPU 4x sequentially executes the above-described acquisition processing, the above-described determination processing, and the above-described execution processing. In this way, as in the configuration diagram on the upper side of FIG. 2, the control unit 4 of the optical communication device 1 achieves functions of the storage unit 4a, the acquisition unit 4b, the determination unit 4c, and the execution unit 4d.

The storage unit 4a stores a table in which the vendor information (vendor IDs) and the processing sequences (processing orders) are associated with each other. The acquisition unit 4b acquires the vendor information of the optical modules 6 to 9 mounted on the ports of the optical communication device 1. As for the acquisition of the vendor information (vendor IDs) by the acquisition unit 4b, specifically, when the optical modules 6 to 9 are connected, the vendor information may be acquired from control units provided in the optical modules, or input of the vendor information may be received from the outside. With reference to the acquired vendor information and the table, the determination unit 4c determines a processing sequence to be executed. The execution unit 4d executes determined processing sequences for the optical modules 6 to 9.

FIG. 3 is a diagram illustrating an example of a decision table to be referred to for determining the processing sequence from the vendor identification (ID) as an example of the identification information of the optical module.

The decision table of FIG. 3 is a decision table for multi-vendor control. In the decision table of FIG. 3, for the vendor A, the vendor B, the vendor C and the another as the vendor IDs, the processing sequences to be executed for the optical modules are held in such a way as to make pairs therewith. In other words, in the decision table of FIG. 3, each of the processing sequences is stored in association with each of the vendor IDs of the optical modules. In the decision table of FIG. 3, for each vendor ID, information regarding first processing, second processing, third processing, and fourth processing is held. It is also conceived that the decision table of FIG. 3 can be configured inside of the memory 4y of the control unit 4 in FIG. 1, or can be configured inside of the CPU 4x of the control unit 4, or can be configured outside of the control unit 4 in FIG. 1.

(Operation of Light Transmission Device)

Figure 4:
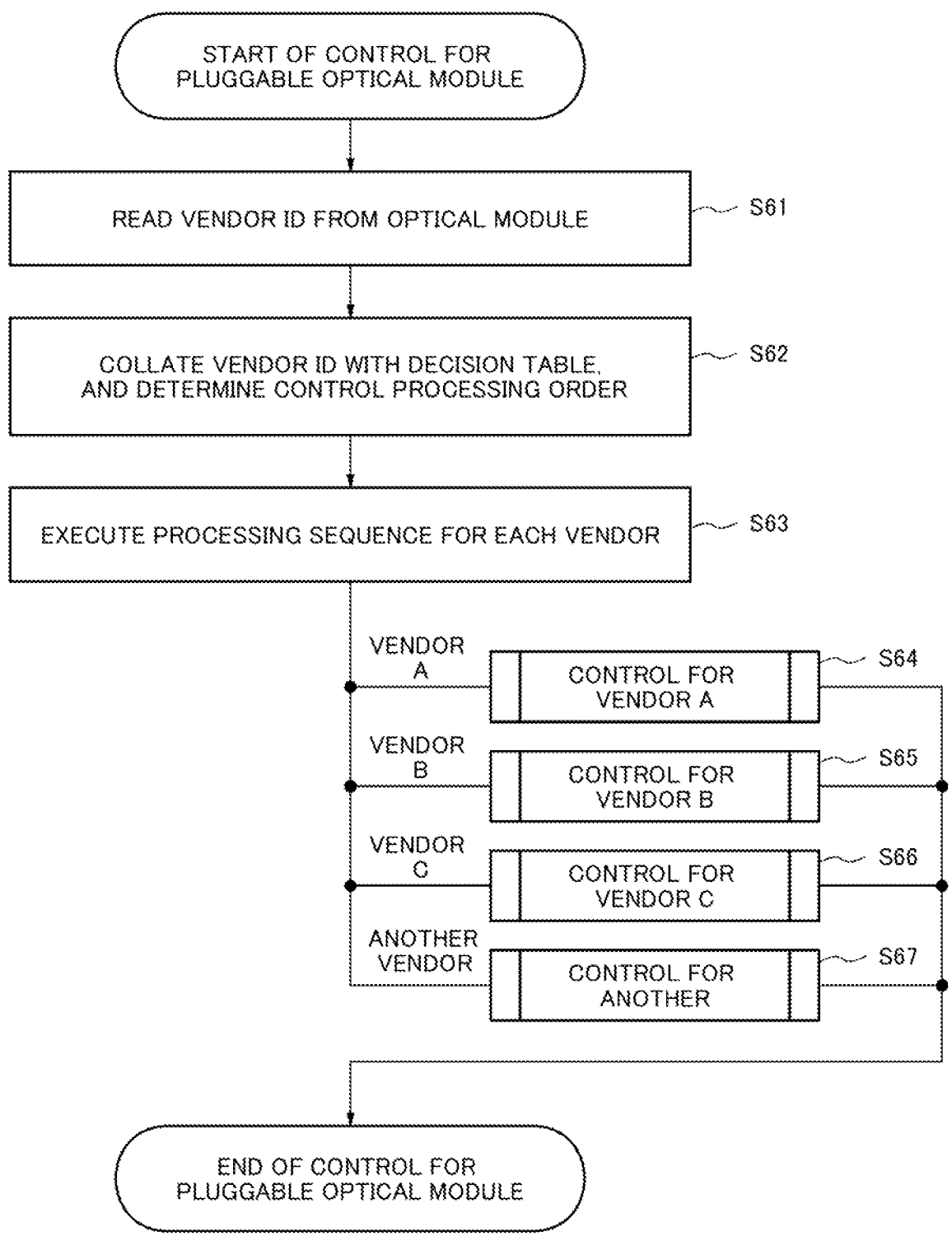
FIG. 4 is a flowchart for explaining a control method of the light transmission device according to the first example embodiment.
Figure 5:
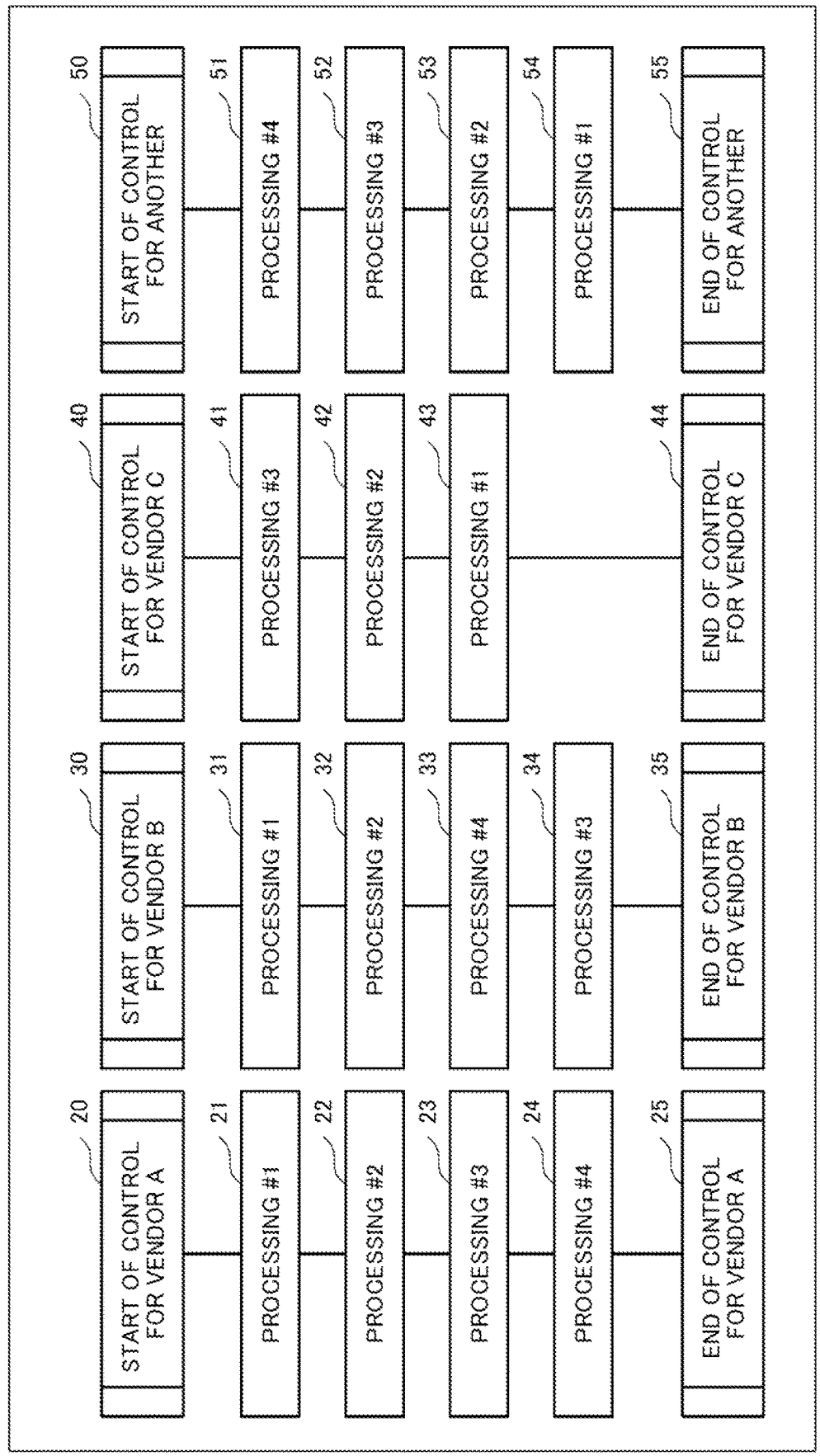
FIG. 5 is a flowchart illustrating an example of a processing sequence to be executed for each of optical modules 6 to 9 of the light transmission device according to the first example embodiment.

Next, with reference to the drawings, a description will be given of an operation of the light transmission device and switching and execution of the processing sequence associated to the vendor of the optical module to be mounted. FIG. 4 is a flowchart for explaining a control method of the light transmission device according to the present example embodiment. FIG. 5 is a flowchart illustrating an example of the processing sequences to be executed for each of the optical modules 6 to 9 of the light transmission device according to the present example embodiment.

For example, when the optical modules 6 to 9 are mounted on the ports, the control unit 4 of the optical communication device 1 reads vendor IDs written into the optical modules 6 to 9 and held by the optical modules 6 to 9 (S61). Next, the control unit 4 of the optical communication device 1 collates the read vendor IDs with the decision table of FIG. 3, and determines the processing sequences which are control processing orders associated to the read vendor IDs (S62). Next, the control unit 4 of the optical communication device 1 executes the determined processing sequences for each of the vendors (S63). In the optical communication device 1 in FIG. 1, for the optical module 6, the control unit 4 executes the processing sequence for the vendor A (S64), and for the optical module 7, executes the processing sequence for the vendor B (S65). For the optical module 8, the control unit 4 executes the processing sequence for the vendor C (S66), and for the optical module 9, executes the processing sequence for the another vendor (S67). Each of the optical modules 6 to 9 mounted on the optical communication device 1 and thus subjected to the processing sequences can start a conversion function between the electrical signal and the optical signal.

(Effect of Light Transmission Device)

According to the light transmission device of the present example embodiment, it can be configured in such a way that the processing sequences are switchable in accordance with the vendors of the optical modules to be mounted. The light transmission device according to the present example embodiment is configured in such a way as to be capable of storing the processing sequences for each of the vendors in the decision table and referring to the processing sequences associated to the acquired vendor information. In this way, it becomes possible to execute the appropriate processing sequence even when the vendor of the optical module to be connected is changed or when a plurality of the vendors are present.

Thus, even when a user of the light transmission device changes the optical module, and the manufacturing vendor of the changed optical module differs from the manufacturing vendor of the optical module connected when the operation is started, the control unit 4 can cause the optical module to execute a processing sequence optimum for the optical module. Thus, the light transmission device can be operated while avoiding an activation-disabled state of the optical module and further causing the changed optical module to exert expected maximum performance.

Second Example Embodiment

Figure 6:
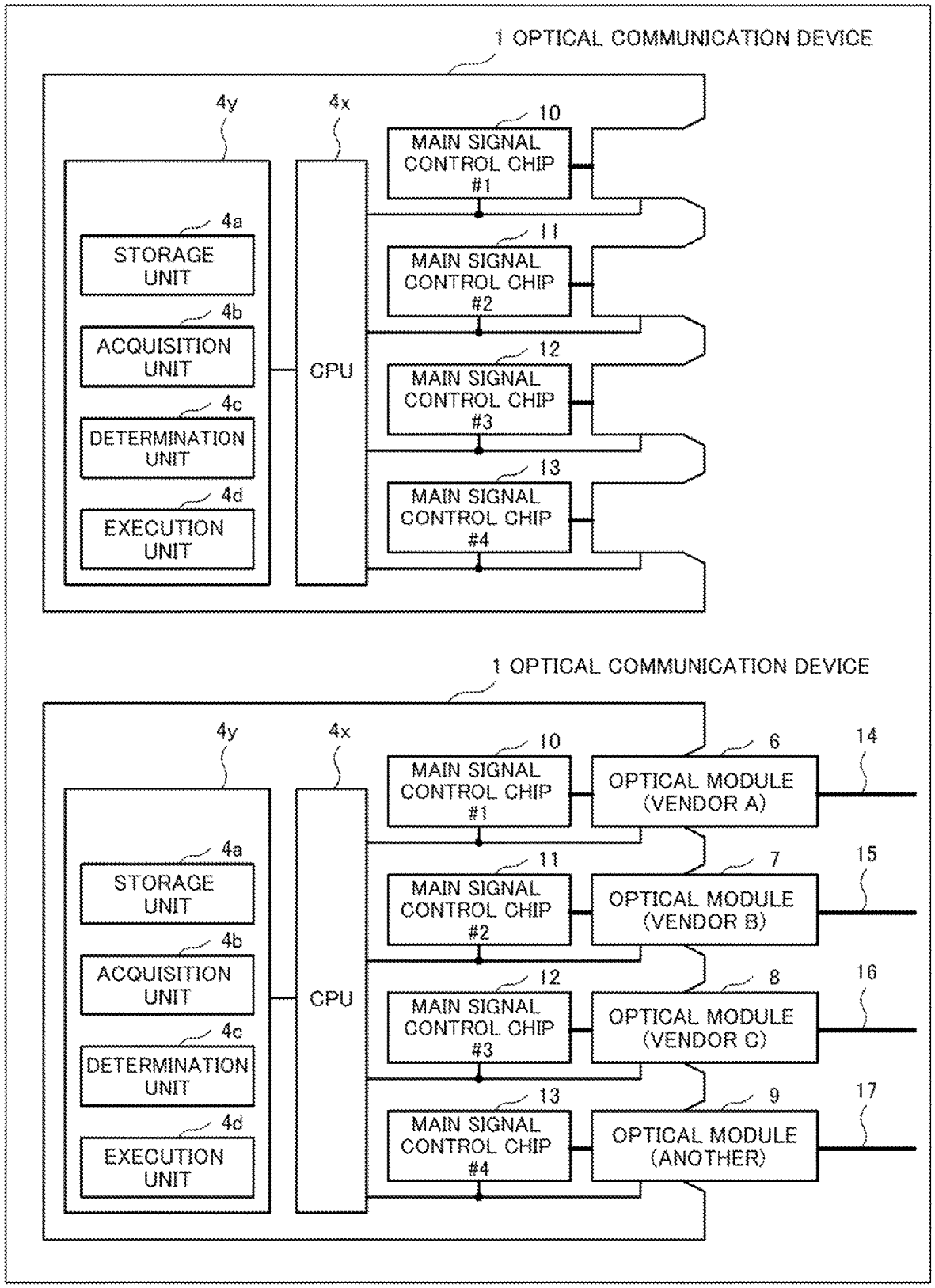
FIG. 6 is a configuration diagram for explaining a light transmission device according to a second example embodiment.

Next, a description will be given of a light transmission device according to a second example embodiment of the present invention and a control method of the same. FIG. 6 is a configuration diagram for explaining the light transmission device according to the second example embodiment of the present invention.

(Configuration of Light Transmission Device)

FIG. 6 illustrates an optical communication device as an example of the light transmission device that transmits/receives an optical signal via an optical fiber network. As in the first example embodiment, an optical communication device 1 in FIG. 6 is a light transmission device provided with four ports, the light transmission device serving as an example of the light transmission device provided with ports to be mounted with optical modules which transmit optical signals. As in the first example embodiment, the optical communication device 1 in FIG. 6 has a control unit 4 including a CPU 4x and a memory 4y. As in the first example embodiment, by the CPU and the memory, the control unit 4 achieves functions equivalent to those of the storage unit 4a, the acquisition unit 4b, the determination unit 4c, and the execution unit 4d.

The optical communication device 1 in FIG. 6 further includes the CPU 4x, a main signal control chip (#1) 10, a main signal control chip (#2) 11, a main signal control chip (#3) 12, and a main signal control chip (#4) 13. The optical communication device 1 in FIG. 6 is capable of issuing execution instructions of the processing sequences to the main signal control chips 10 to 13 and optical modules 6 to 9.

The CPU 4x has functions of executing a program of the control unit in the memory 4y and controlling the optical communication device 1, the main signal control chips 10 to 13, and the multi-vendor optical modules 6 to 9.

The main signal control chips 10 to 13 are provided for each of the optical modules to be mounted on the ports, and control main signals of the optical modules to be mounted on the ports. More specifically, the main signal control chips 10 to 13 are digital signal processors (DSPs), and perform digital signal processing for the main signals to be transferred.

Figure 7:
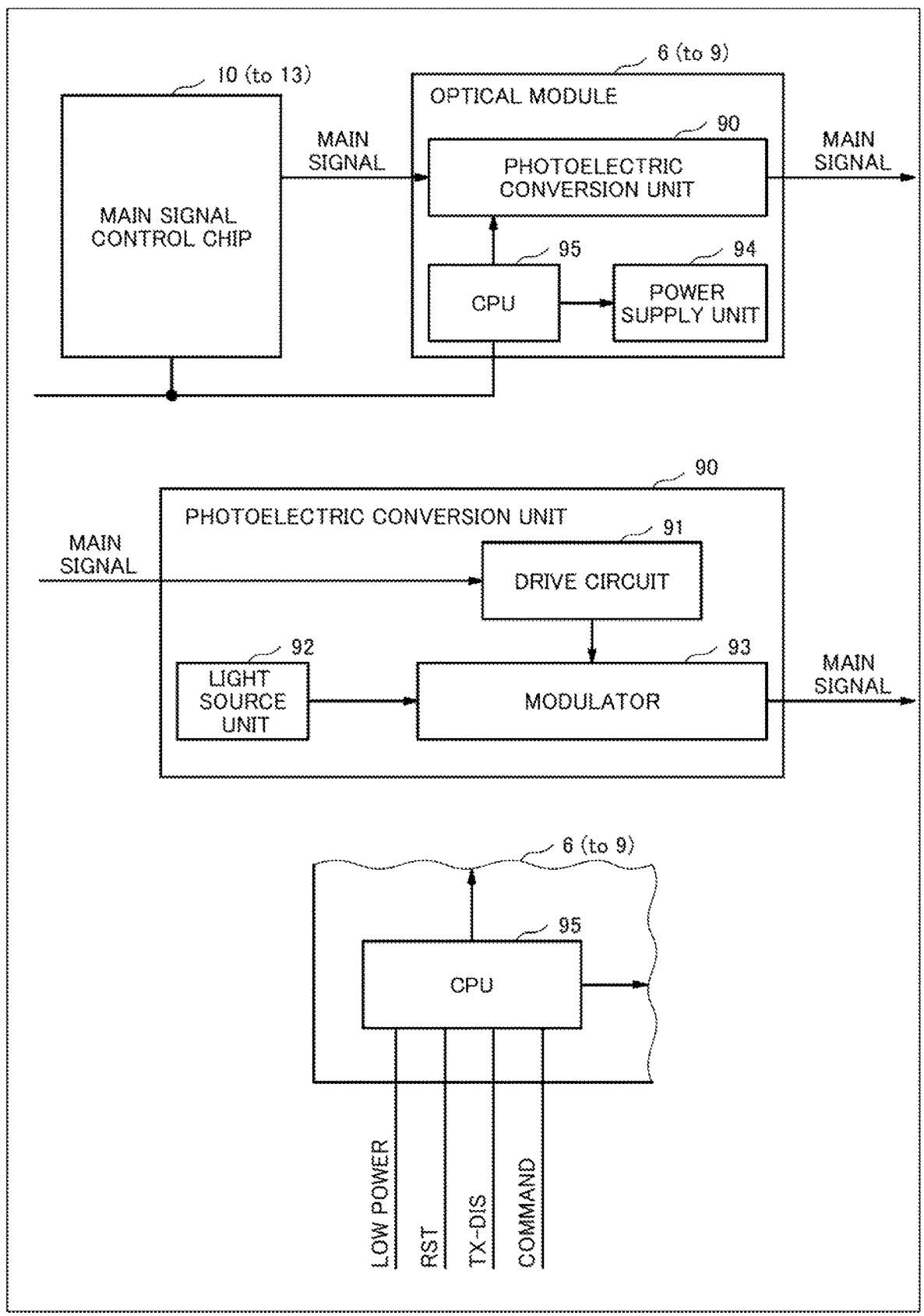
FIG. 7 is a block diagram for explaining more detailed configurations of a main signal control chip and the optical module in FIG. 6.

Next, with reference to FIG. 7, a description will be given of a more detailed configuration of each of the optical modules. FIG. 7 is a block diagram for explaining more detailed configurations of the main signal control chip and the optical module in FIG. 6. FIG. 7 illustrates one of combinations of the main signal control chips and the optical modules in FIG. 6. The main signal control chip 10 (to 13) outputs, to the optical module, the main signal that is an electrical signal to be subjected to photoelectric conversion by the optical module. The optical module 6 (to 9) includes a CPU 95 therein, and controls internal components (a photoelectric conversion unit 90, a power supply unit 94, and the like) in accordance with an instruction to execute the processing sequence, the instruction being to be input from the optical communication device 1. As illustrated on an upper side of FIG. 7, the optical module 6 (to 9) includes: the photoelectric conversion unit 90 that converts the electrical signal from the main signal control chip 10 (to 13) into an optical signal and outputs the optical signal; the power supply unit 94 that supplies a necessary operation power supply to each element in the optical module 6 (to 9); and the CPU 95 that controls the photoelectric conversion unit 90 and the power supply unit 94.

As illustrated on a center of FIG. 7, the photoelectric conversion unit 90 of the optical module 6 (to 9) includes: a drive circuit 91 that amplifies a data signal (electricity) output from the main signal control chip 10 (to 13) in the optical communication device 1 and generates a drive signal (electricity); a light source unit 92 that outputs light; and a modulator 93 that modulates the light from the above-described light source unit 92 in accordance with the above-described applied drive signal and outputs an optical signal.

As illustrated on a lower side of FIG. 7, a CPU 95 in the optical module 6 (to 9) is supplied, for example, with a LOWPOWER signal, an RST signal, a TX-DIS signal, and a COMMAND signal, and a control from the optical communication device 1 to the optical module 6 (to 9) is performed. The LOWPOWER signal is a signal instructing the optical module 6 (to 9) to turn on a power or turn off the power. The RST signal is a signal instructing the optical module 6 (to 9) to perform a reboot operation, i.e., to perform an operation of initializing a status and data in the optical module 6 (to 9). The TX-DIS signal is a signal instructing the optical module to stop sending the optical signal therefrom. The COMMAND signal is a signal issuing an instruction to the function to be executed by the optical module 6 (to 9), and for example, the signal includes an instruction to switch a wavelength of the optical signal, an instruction to change a light output intensity of the optical signal, an instruction to change an operation mode, and the like.

Moreover, the main signal control chip 10 (to 13) is also supplied with the LOWPOWER signal, and a control from the optical communication device 1 to the main signal control chip 10 (to 13) is performed. For example, the control unit 4 of the optical communication device 1 commands the main signal control chip 10 (to 13) to make transition to a Low Power state, and the main signal control chip 10 (to 13) turns to a power-off state. The control unit 4 of the optical communication device 1 commands the main signal control chip 10 (to 13) to release the Low Power state, and the main signal control chip 10 (to 13) turns to a power-on state.

The controls for the optical module 6 (to 9) and the main signal control chip 10 (to 13) by the LOWPOWER signal, the RST signal, the TX-DIS signal, and the COMMAND signal may be issued as instructions via hardware pins provided in the optical module 6 (to 9) and the main signal control chip 10 (to 13).

(Operation of Light Transmission Device)

Next, with reference to the drawing, a description will be given of an operation of the light transmission device and switching and execution of the processing sequence associated to the vendor of the optical module to be mounted. The optical communication device 1 in the present example embodiment is different from that in the first example embodiment in that this optical communication device 1 includes the main signal control chips 10 to 13, and that the control unit 4 of the optical communication device 1 causes a pair of the main signal control chip 10 and the optical module 6 to execute the processing sequence.

Figure 8:
FIG. 8 is a flowchart illustrating an example of a processing sequence to be executed for each of optical modules 6 and 7 of the light transmission device according to the second example embodiment.
Figure 9:
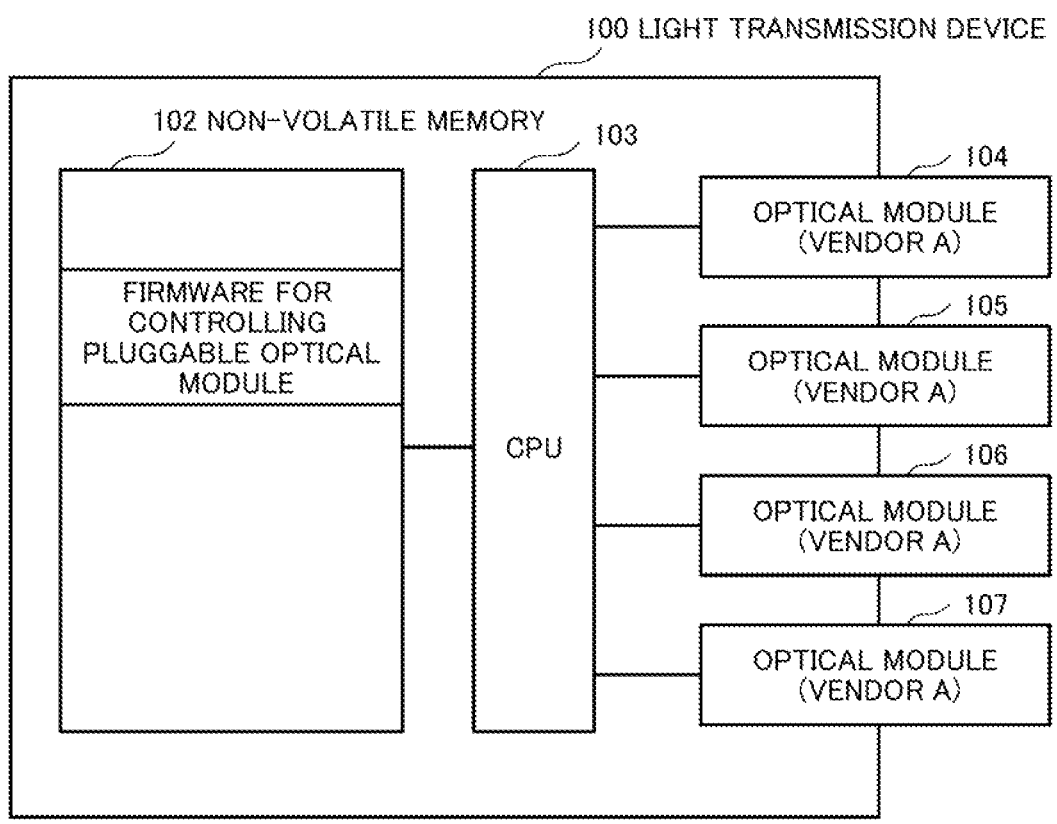

FIG. 8 is a flowchart illustrating an example of the processing sequence to be executed for each of the optical modules 6 and 7 of the light transmission device according to the second example embodiment. As in the first example embodiment, the control unit 4 of the optical communication device 1 sequentially implements an acquisition processing of acquiring identification information of the optical module to be mounted, determination processing of determining, from the acquired identification information of the optical module, a processing sequence associated to the identification information of the optical module, and execution processing of executing the determined processing sequence for the optical module. Thus, for the optical module mounted on the light transmission device, the control unit 4 of the optical communication device 1 can implement the processing sequence in accordance with the identification information of the optical module.

Also, in the present example embodiment, it is assumed that a decision table is referred to for the determination processing of determining, from the acquired identification information of the optical module, the processing sequence associated to the identification information of the optical module. In the decision table according to the present example embodiment, although this is not illustrated, it is assumed that contents of the first processing to the seventh processing and processing orders, each of which is associated to each of piece of processing in the flowchart of FIG. 8 for example, are held for each vendor ID.

For example, when the optical modules 6 to 9 are mounted on the ports, the control unit 4 of the optical communication device 1 in FIG. 6 reads the vendor IDs written into the optical modules 6 to 9 and held by the optical modules 6 to 9. Next, the control unit 4 of the optical communication device 1 collates the read vendor IDs with the decision table and determines the processing sequence which is a control processing order associated to the read vendor ID. In accordance with the processing sequences thus determined, the processing sequence for the vendor A and the processing sequence for the vendor B are executed. In the flowchart of FIG. 8, for the optical module of the vendor A, a processing sequence of executing processing #1, processing #2, processing #3, processing #4, processing #5, processing #6, and processing #7 in this order is illustrated. For the optical module of the vendor B, a processing sequence of executing processing #1, processing #4, processing #5, processing #2, processing #3, processing #6, and processing #7 in this order is illustrated.

A brief description will be given of the processing sequence to be executed for the optical module of the vendor A, an example of which is illustrated in the flowchart of FIG. 8. First, the control unit 4 commands the main signal control chip 10 and the optical module 6 to make transition to a Low Power state (processing #1). Next, the control unit 4 commands the optical module 6 to release the Low Power state (processing #2). Next, the control unit 4 confirms that the optical module 6 has made transition to a High Power state (processing #3). Next, the control unit 4 commands the main signal control chip 10 to release the Low Power state (processing #4). Next, the control unit 4 confirms that the main signal control chip has made transition to a High Power state (processing #5). Next, the control unit 4 commands the optical module 6 to emit light (processing #6). Next, the control unit 4 confirms that the optical module 6 has emitted light (processing #7). Thus, by a series of the control sequence for the main signal control chip 10 and the optical module 6, the control unit 4 of the optical communication device 1 can control the optical module 6 to a state of being capable of outputting an optical signal.

A brief description will be given of the processing sequence to be executed for the optical module of the vendor B, an example of which is illustrated in the flowchart of FIG. 8. First, the control unit 4 commands the main signal control chip 11 and the optical module 7 to make transition to a Low Power state (processing #1). Next, the control unit 4 commands the main signal control chip 11 to release the Low Power state (processing #4). Next, the control unit 4 confirms that the main signal control chip 11 has made transition to a High Power state (processing #5). Next, the control unit 4 commands the optical module 6 to release the Low Power state (processing #2). Next, the control unit 4 confirms that the optical module 6 has made transition to a High Power state (processing #3). Next, the control unit 4 commands the optical module 6 to emit light (processing #6). Next, the control unit 4 confirms that the optical module 6 has emitted light (processing #7). Thus, by a series of the control sequence for the main signal control chip 11 and the optical module 7, the control unit 4 of the optical communication device 1 can control the optical module 7 to a state of being capable of outputting an optical signal.

(Effect of Light Transmission Device)

According to the light transmission device according to the present example embodiment, it can be configured in such a way that the processing sequences are switchable in accordance with the vendors of the optical modules to be mounted. The light transmission device according to the present example embodiment is configured in such a way as to be capable of storing the processing sequences for each of the vendors in the decision table and referring to the processing sequences associated to the acquired vendor information. In this way, it becomes possible to execute the appropriate processing sequence even when the vendor of the optical module to be connected is changed or when a plurality of the vendors are present.

Thus, even when a user of the light transmission device changes the optical module, and the manufacturing vendor of the changed optical module becomes different from the manufacturing vendor of the optical module connected when the operation is started, the control unit 4 can cause the optical module to execute a processing sequence optimum for the optical module. Thus, the light transmission device can be operated while avoiding an activation-disabled state of the optical module and further causing the changed optical module to exert expected maximum performance.

According to the light transmission device according to the present example embodiment, it can be configured in such a way that the processing sequences are switchable for the optical modules and the main signal control chips which control the main signals of the optical modules in accordance with the vendors of the optical modules to be mounted. For combinations of the main signal control chips 10 to 13 performing the digital signal processing for the main signals thus transferred, and the optical modules 6 to 9, the control unit 4 can execute optimal processing sequences for the main signal control chips and the optical modules. Thus, the light transmission device can be operated while avoiding the activation-disabled state of the optical module and further causing the changed optical module to exert expected maximum performance.

Other Example Embodiments

The preferred example embodiments of the present invention have been described above; however, the present invention is not limited to these.

In the first example embodiment, it has been described that there is used the decision table in which vendor IDs and processing sequences to be executed for optical modules are held in such a way as to make pairs; however, the form of the table is not limited to this. For example, tables may be held for each type of the processing sequences, and a table to be referred to may be changed in accordance with a type of a control sequence to be executed. When not only the vendor ID but also the type is referred to, it may be configured to have a table for each type.

In the above-mentioned first example embodiment and second example embodiment, the processing sequences to be executed are determined with reference to the acquired vendor information and the decision table; however, for the determination of the processing sequences, a method other than the reference of the decision table is also conceived. For example, it is also conceived to configure such a logic circuit that the processing sequences to be executed are derived from the vendor information read from the optical modules, and the processing sequences associated to the vendor information are thus executed.

As mentioned above, the vendor information of optical modules may be acquired from the control units provided in the optical modules when the optical modules are connected to the optical communication device 1, or an input of the vendor information may be received from outside. The optical communication device 1 may read the vendor information in accordance with the connection of the optical modules, and start to determine the processing sequences.

Moreover, in actual operations, also assumed is a scene where an optical module of which vendor information is not stored in the decision table is mounted on the optical communication device 1. When the vendor information read from the optical module is the vendor information that is not stored in the decision table, the optical communication device 1 may output an alarm. In the decision table of FIG. 3, those of which the vendor to IDs are the vendor A, the vendor B, and the vendor C are individually held, and that of which the vendor ID is another is held. It can be considered that vendors other than the vendor A, the vendor B, and the vendor C are commonly subjected to the processing sequence associated to the another. On assumption of a scene where the vendor information read from the optical module is not stored in the decision table, a processing sequence to be applied to such an unregistered vendor may be stored in the table, and then, this processing sequence may be executed.

For the purpose of storing the processing sequence for the unregistered vendor information in the table, the optical communication device 1 may have an interface for registering the processing sequence by an external device.

The whole or part of the example embodiments disclosed above can be described as, but not limited to, the following supplementary notes.

(Supplementary Note 1) A light transmission device provided with a port to be mounted with an optical module that transmits an optical signal, the light transmission device including: a storage means for holding a table in which a processing sequence associated to each piece of identification information of the optical module is stored; and a control means for acquiring identification information of a mounted optical module, determining a processing sequence associated to the acquired identification information of the optical module with reference to the table, and executing a determined processing sequence for the optical module.

(Supplementary Note 2) The light transmission device according to supplementary note 1, wherein the control means includes: an acquisition means for acquiring identification information of the optical module to be mounted; a determination means for determining, with reference to the table, a processing sequence associated to the acquired identification information of the optical module; and an execution means for executing, for the optical module, a processing sequence determined by the determination means.

(Supplementary Note 3) The light transmission device according to supplementary note 1 or 2, wherein the table further stores a processing sequence to be executed for an optical module in which the acquired identification information of the optical module is unregistered in the table.

(Supplementary Note 4) The light transmission device according to any one of supplementary notes 1 to 3, further including a plurality of ports to be mounted with the optical module, and a main signal control means for controlling a main signal of the optical module for each of the ports.

(Supplementary Note 5) The light transmission device according to supplementary note 4, wherein a processing sequence associated to identification information of the optical module includes first processing of causing both of the main signal control means and the optical module to make transition to a low power mode, second processing of causing the optical module to make transition to a high power mode after the first processing, and third processing of causing the main signal control means to make transition to a high power mode after the second processing.

(Supplementary Note 6) The light transmission device according to supplementary note 4, wherein a processing sequence associated to identification information of the optical module includes first processing of causing both of the main signal control means and the optical module to make transition to a low power mode, second processing of causing the main signal control means to make transition to a high power mode after the first processing, and third processing of causing the optical module to make transition to a high power mode after the second processing.

(Supplementary Note 7) The light transmission device according to any one of supplementary notes 1 to 6, wherein identification information of the optical module to be mounted includes vendor information of the optical module, the vendor information being held by the optical module.

(Supplementary Note 8) A light transmission system including: the light transmission device according to any one of supplementary notes 1 to 7; and an optical module to be mounted on the port of the light transmission device.

(Supplementary Note 9) A control method of a light transmission device provided with a port to be mounted with an optical module that transmits an optical signal, the control method including: acquiring identification information of a mounted optical module; determining a processing sequence associated to identification information of an optical module from the acquired identification information of the optical module to be mounted; and executing a determined processing sequence for the optical module.

(Supplementary Note 10) The control method of a light transmission device according to supplementary note 9, wherein the determining a processing sequence associated to identification information of the optical module is performed by referring to a table in which a processing sequence associated to each piece of identification information of the optical module is stored.

(Supplementary Note 11) The control method of a light transmission device according to supplementary note 9 or 10, wherein identification information of the optical module to be mounted includes vendor information of the optical module, the vendor information being held by the optical module.

(Supplementary Note 12) A control program of a light transmission device provided with a port to be mounted with an optical module that transmits an optical signal, the control program causing a control unit to execute: acquisition processing of acquiring identification information of a mounted optical module; determination processing of determining a processing sequence associated to identification information of an optical module from the acquired identification information of the optical module to be mounted; and execution processing of executing a determined processing sequence for the optical module.

(Supplementary Note 13) The control program of a light transmission device according to supplementary note 12, wherein determination processing of determining the processing sequence is performed by referring to a table in which a processing sequence associated to each piece of identification information of the optical module is stored.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2019-59076 filed on Mar. 26, 2019, the disclosure of which is incorporated herein in its entirety by reference.

REFERENCE SIGNS LIST

1 Optical communication device
4 Control unit
4a Storage unit
4b Acquisition unit
4c Determination unit
4d Execution unit
4x CPU
4y Memory
6, 7, 8, 9 Optical module
10, 11, 12, 13 Main signal control chip

The invention claimed is:

1. A light transmission device provided with a port to be mounted with an optical module that transmits an optical signal, the light transmission device comprising:
a memory having instructions stored therein; and
a processor configured to execute the instructions stored in the memory, that when executed comprise:
an acquisitor that acquires identification information of the optical module mounted to the port;
a determinator that determines a processing sequence associated to the identification information of the optical module from a plurality of processing sequences;
an executor that executes a determined processing sequence for the optical module; and
a storage that stores a table in which the plurality of processing sequences is stored,
wherein the determinator determines a processing sequence associated with the acquired identification information of the optical module with reference to the table, and
the table further stores a processing sequence to be executed for an optical module in which the acquired identification information of the optical module is unregistered in the table.

2. The light transmission device according to claim 1, further comprising
a plurality of ports to be mounted with the optical module, and
a main signal control unit that controls a main signal of the optical module for each of the ports.

3. The light transmission device according to claim 2, wherein
a processing sequence associated with identification information of the optical module includes
first processing of causing both of the main signal control unit and the optical module to transition to a low power mode, second processing of causing the optical module to transition to a high power mode after the first processing, and third processing of causing the main signal control unit to transition to a high power mode after the second processing.

4. The light transmission device according to claim 2, wherein
a processing sequence associated with identification information of the optical module includes
first processing of causing both the main signal control unit and the optical module to transition to a low power mode, second processing causing the main signal control unit to transition to a high power mode after the first processing, and third processing causing the optical module to transition to a high power mode after the second processing.

5. The light transmission device according to claim 1, wherein
identification information of the optical module to be mounted includes vendor information of the optical module, the vendor information being held by the optical module.

6. A light transmission system comprising:
the light transmission device according to claim 1; and
an optical module to be mounted on the port of the light transmission device.

7. The light transmission device according to claim 1, wherein
the port is capable of mounting any one of the plurality of optical modules having the identification information different from each other; and
the plurality of processing sequences corresponds to the identification information that is different from each other.

8. A control method of a light transmission device provided with a port to be mounted with an optical module that transmits an optical signal, the control method comprising:
acquiring identification information of the optical module mounted to the port;
determining, with reference to a table, a processing sequence associated with the identification information of the optical module from a plurality of processing sequences stored in the table, the table further storing a processing sequence to be executed for an optical module in which the acquired identification information of the optical module is unregistered in the table; and
executing a determined processing sequence for the optical module.

9. The control method of a light transmission device according to claim 8, wherein
the processing sequence, stored in the table and associated with the identification information of the optical module, is associated with each piece of identification information of the optical module.

10. A non-transitory computer-readable storage medium recording a control program of a light transmission device provided with a port to be mounted with an optical module that transmits an optical signal, the control program causing a control unit to execute:
acquisition processing of acquiring identification information of the optical module mounted to the port;
determination processing of determining, with reference to a table, a processing sequence associated with the identification information of the optical module from a plurality of processing sequences stored in the table, the table further storing a processing sequence to be executed for an optical module in which the acquired identification information of the optical module is unregistered in the table; and execution processing of executing a determined processing sequence for the optical module.

11. The non-transitory computer-readable storage medium recording a control program of a light transmission device according to claim 10, wherein the processing sequence, stored in the table and associated with the identification information of the optical module, is associated with each piece of identification information of the optical module.

* * * * *